(12) United States Patent
Gal et al.

(10) Patent No.: US 9,463,416 B2
(45) Date of Patent: Oct. 11, 2016

(54) SIMULTANEOUS HIGH EFFICIENCY CAPTURE OF $CO_2$ AND $H_2S$ FROM PRESSURIZED GAS

(71) Applicants: EIG, Inc., Sunnyvale, CA (US); SRI International, Menlo Park, CA (US)

(72) Inventors: Eli Gal, Sunnyvale, CA (US); Gopala N. Krishnan, Sunnyvale, CA (US); Indira S. Jayaweera, Fremont, CA (US)

(73) Assignees: EIG, Inc., Sunnyvale, CA (US); SRI International, Menlo Park, CA (US)

( * ) Notice: Subject to any disclaimer, the term of this patent is extended or adjusted under 35 U.S.C. 154(b) by 199 days.

(21) Appl. No.: 14/347,017

(22) PCT Filed: Sep. 26, 2012

(86) PCT No.: PCT/US2012/057205
§ 371 (c)(1),
(2) Date: Mar. 25, 2014

(87) PCT Pub. No.: WO2013/049114
PCT Pub. Date: Apr. 4, 2013

(65) Prior Publication Data
US 2014/0234176 A1    Aug. 21, 2014

Related U.S. Application Data

(60) Provisional application No. 61/539,144, filed on Sep. 26, 2011.

(51) Int. Cl.
*B01D 53/14* (2006.01)
*B01D 53/52* (2006.01)
*B01D 53/62* (2006.01)
*C10L 3/10* (2006.01)

(52) U.S. Cl.
CPC ......... *B01D 53/526* (2013.01); *B01D 53/1406* (2013.01); *B01D 53/1462* (2013.01);

(Continued)

(58) Field of Classification Search
CPC ............ B01D 2252/102; B01D 2257/504; B01D 53/1406; B01D 53/1462; B01D 53/526; B01D 53/62; C10L 3/103; C10L 3/104; Y02C 10/04; Y02C 10/06; Y02C 20/20
See application file for complete search history.

(56) References Cited

U.S. PATENT DOCUMENTS

2008/0307968 A1    12/2008 Kang
2011/0100216 A1*    5/2011 Kozak ............... B01D 53/1493
                                                            95/168

FOREIGN PATENT DOCUMENTS

| EP | 2230000 | 6/2013 |
|---|---|---|
| WO | WO2009000025 | 12/2008 |
| WO | WO2009091437 | 7/2009 |

*Primary Examiner* — Duane Smith
*Assistant Examiner* — Cabrena Holecek
(74) *Attorney, Agent, or Firm* — Lumen Patent Firm

(57) ABSTRACT

Low-cost and energy-efficient $CO_2$ and $H_2S$ capture is provided obtaining greater than 99.9% capture efficiency from pressurized gas. The acid species are captured in an ammonia solution, which is then regenerated by stripping the absorbed species. The solution can capture as much as 330 grams of $CO_2$ and $H_2S$ per 1000 gram of water and when regenerated it produces pure pressurized acid gas containing more than 99.7% $CO_2$ and H2S. The absorption of the acid species is accomplished in two absorbers in-series, each having multiple stages. More than 95% of the acid species are captured in the first absorber and the balance is captured in the second absorber to below 10 ppm concentration in the outlet gas. The two absorbers operate at temperatures ranging from 20-70 degrees Celsius. The two absorbers and the main stripper of the alkaline solution operate at similar pressures ranging from 5-200 bara.

12 Claims, 5 Drawing Sheets

(52) U.S. Cl.
CPC ............... B01D53/62 (2013.01); C10L 3/103 (2013.01); C10L 3/104 (2013.01); *B01D 2252/102* (2013.01); *B01D 2257/504* (2013.01); *Y02C 10/04* (2013.01); *Y02C 10/06* (2013.01); *Y02C 20/20* (2013.01)

SIMULTANEOUS HIGH EFFICIENCY CAPTURE OF $CO_2$ AND $H_2S$ FROM PRESSURIZED GAS

CROSS-REFERENCE TO RELATED APPLICATIONS

This application is a 371 of PCT/US2012/057205 filed on Sep. 26, 2012. PCT/US2012/057205 claims the benefit of 61/539,144 filed on Sep. 26, 2011.

STATEMENT OF GOVERNMENT SPONSORED SUPPORT

This invention was made with Government support under grant no. DE-FE0000896 awarded by the Department of Energy. The Government has certain rights in this invention.

FIELD OF THE INVENTION

The invention relates to methods and systems for high efficiency capture of acid species, mainly $CO_2$ and $H_2S$, from pressurized gases in alkaline solution containing ammonia and regeneration of the solution by stripping the absorbed acid species.

BACKGROUND OF THE INVENTION

Capturing $H_2S$ and $CO_2$ from gases is important in many industrial processes where the $H_2S$ and $CO_2$ are contaminants and have to be removed before further processing. Capturing the $H_2S$ and $CO_2$ is also important for environmental reasons where $H_2S$, before or after its combustion, contributes to the formation of acid rain and $CO_2$ is associated with global warming.

There are many commercial chemical and physical processes for capturing $H_2S$ and $CO_2$ from pressurized gas. Chemical processes include absorbents such as amine based processes, the Benfield process using potassium carbonate and many more. Physical processes include the Selexol process, the methanol based Rectisol process and more. These processes are typically expensive and require significant input of heat and electricity. In addition, most of available commercial processes can only capture small amount of $CO_2$ and $H_2S$ per unit volume of absorbent, typically in the 30-60 grams/liter and thus requiring the pumping and circulation of large volumes of solutions and making the reactors, pumps, pipes, heat exchangers large and expensive. In many of these processes the capture efficiency of $CO_2$ and $H_2S$ is relatively low and requires polishing steps downstream. Furthermore, another concern is that the stripped acid species are at low pressure and require high cost and energy intensive compression. Also, higher pressure gas results in higher solubility of non-acidic species such as $H_2$, CO and $CH_4$ in the absorber outlet solution. As a result, the stripped acid gas contains $H_2$, CO and $CH_4$ in concentrations that require further cleaning treatment and also results in loses of valuable matter.

There is a need in the art for a dramatically improved system and process for capturing $H_2S$ and $CO_2$ and reduce its cost. The present invention addresses this need.

SUMMARY OF THE INVENTION

The present invention provides a process and system integrating very high capture efficiency typically greater than 99% and potentially as high as 99.99%, high acid gas loading in the range of 100-330 grams per 1000 grams of water (3-7 times higher loading than commercially available technologies), produce acid gas at pressure in the range of 5-200 bara and containing more than 99.7% $CO_2$ and $H_2S$, less than 0.3% moisture and practically no non-acidic species such as $H_2$, CO and $CH_4$. The process consumes less than half the energy, combined heat and power than any commercial process. It utilizes a low cost ammonia reagent which is non-degradable and produces no harmful waste stream. The integrated system of the invention reduces the cost of $CO_2$ and $H_2S$ capture to less than half the cost of state of the art technologies. The high efficiency and low cost of the process is enabled by multi-stage absorption system with multiple stages each designed and operated under conditions that optimized the system performance.

Embodiments of the invention capture acid gases, mainly $CO_2$ and $H_2S$, from pressurized gas streams into an absorbing solution and thermally strips the $CO_2$ and $H_2S$ from the absorbing solution to produce pressurized acid gas stream. The absorbing solution is a concentrated ammonia solution containing $NH_3$—$CO_2$—$H_2O$—$H_2S$. In addition to $NH_3$ the absorbing solution may contain alkaline cations such as $Na^+$, $K^+$ and $Li^+$.

Embodiments of the invention include the following units.

1. A multi-stage absorber where 5-15 molal ammoniated solution captures most of the $CO_2$ and $H_2S$ from a pressurized gas stream at net $CO_2$+$H_2S$ loading in the range of 100-330 grams per 1000 grams of water.

2. A multi-stage polishing absorber weak ammonia water solution containing 0-0.2 molal ammonia is used to capture the residual $CO_2$+$H_2S$ in the gas. In addition, the wash solution captures ammonia entrained from the absorber.

3. A main $CO_2$+$H_2S$ stripper where the $CO_2$ and $H_2S$ are stripped from the solution at 5-200 bara pressure to generate pure acid gas stream containing more than 99.7% $CO_2$+$H_2S$ less than 0.3% $H_2O$ and practically no $H_2$, CO, $CH_4$ and $NH_3$.

4. A sour water stripper where $NH_3$, $CO_2$ and $H_2S$ species captured in the polishing absorber are stripped from the water.

Advantages of embodiments of the invention result in much lower capital costs, energy consumption and overall operating costs than any state of the art technology for $CO_2$ and $H_2S$ captures and it could reduce the cost of unit $CO_2$ and $H_2S$ captured by more than 50%.

DETAILED DESCRIPTION

The present invention is a system and process for the high efficient capture of acid gases mainly $CO_2$ and $H_2S$. The acid gas species are captured simultaneously in an alkaline solution containing ammonia or a combination of ammonia and cations such as Na+, K+ and Li+.

Figure 1:
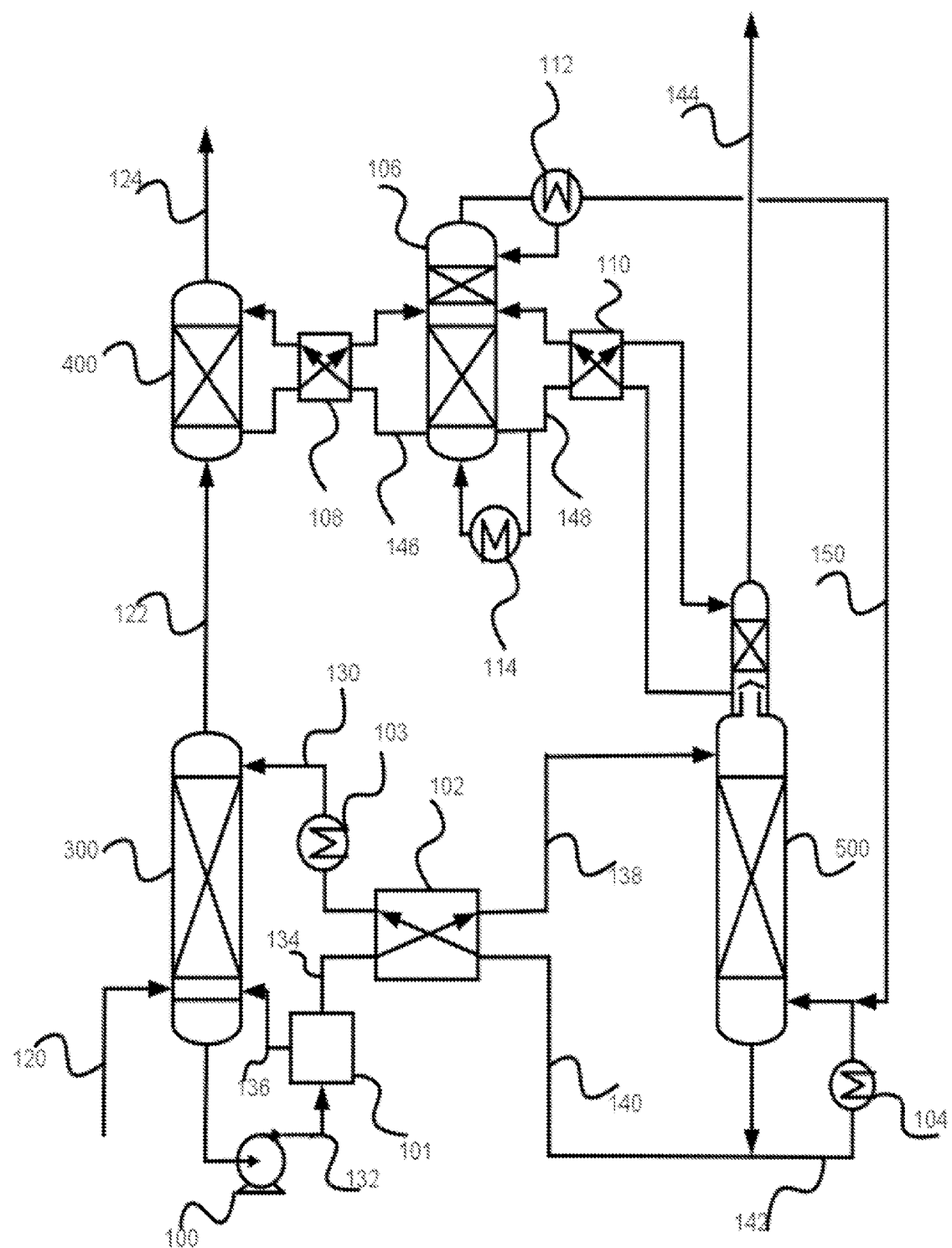
FIG. 1 shows a schematic of a process and system for the simultaneous high efficiency capture of $CO_2$ and $H_2S$ from pressurized gas according to an embodiment of the invention. Elements 108 and 110 are heat exchangers, and element 112 is a compressor.

A schematic of the system for high efficiency capture of $CO_2$ and $H_2S$ from pressurized gas stream is shown in FIG. 1. Stream 120 is a gas stream at a pressure of 5-200 bara, temperature in the range of 10-75 degrees Celsius and containing $CO_2$ or $CO_2+H_2S$. Stream 120 can be syngas from coal or petcoke gasification, syngas from fuel gas steam or auto thermal reformer, natural gas from gas wells, refinery process gas and more. The gas is typically water-saturated and its $CO_2$ concentration is 1-50% mole and $H_{2S}$ concentration is 0-7%. Stream 120 flows through the first stage $CO_2$ and $H_2S$ absorber 300 where more than 95% of the $CO_2$ and $H_2S$ are captured by the absorbing solution. Stream 122 contains the residual of the acid species not captured in absorber 300 and in addition, stream 122 contains $NH_3$ derived from the vapor pressure of the absorbing solution inlet to the first stage absorber 300.

Stream 122 flows to second stage absorber 400 for further cleaning. The feed absorbing solution in the second stage absorber 400 is water from sour water stripper unit 106 containing low concentration of $NH_3$, typically in the range of 0-0.2 molal. The absorbing solution captures the residual $CO_2$ and $H_2S$ to very low levels and in addition it captures entrained ammonia from the first stage absorber. The system is designed in such a way that the gas stream from the first stage absorber 300 contains ammonia to $CO_2$ plus $H_{2S}$ mole ratio smaller than 0.4. The clean gas outlet from the second stage absorber 400, stream 124, contains less than 10 ppm ammonia, less than 10 ppm CO2 and less than 1 ppm H2S.

The inlet absorption solution in the absorber, stream 130, is an ammoniated solution containing 8-15 molal $NH_3$ and with a mole ratio of $CO_2/NH_3$ in the range of 0.2-0.4. The concentration of $CO_2$ and $H_{2S}$ depends on the stripper operation and it can vary depending on the specific application. Stream 130 is fed to the top of a multistage first stage absorber vessel and after absorbing the bulk of the $CO_2$ and $H_2S$, e.g. more than 95%, it is discharged at the bottom as a $CO_2+H_2S$ rich solution, stream 132, with mole ratio of $CO_2/NH_3$ in the range of 0.6-0.7.

Figure 2:
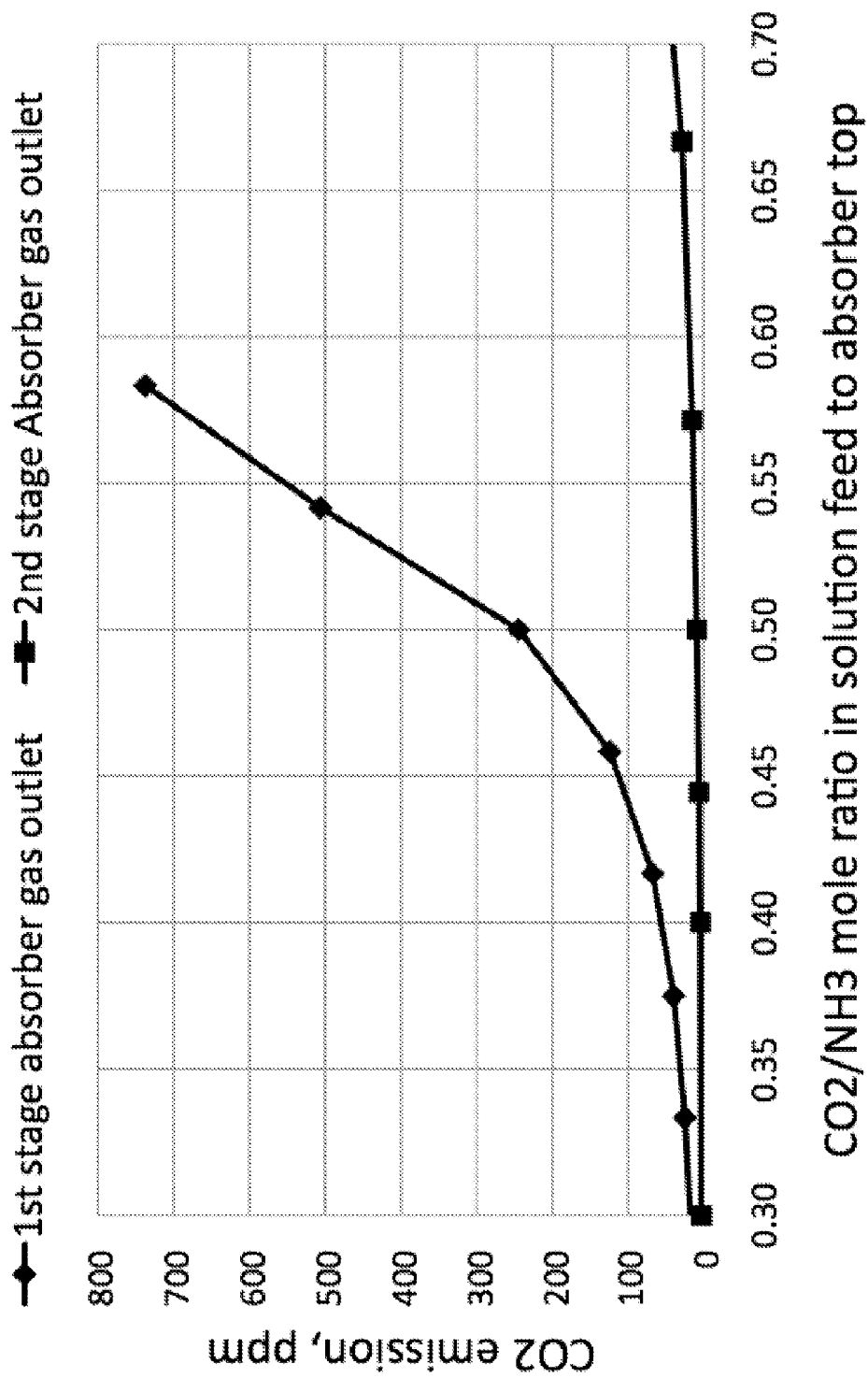
FIG. 2 shows according to an embodiment of the invention data of the emission of $CO_2$ from the first stage absorber and the second stage absorber when the solution is at equilibrium with the gas.

FIG. 2 shows an example of the $CO_2$ emission limit at equilibrium from the top of the first and second stage absorbers operating at 50 Bara pressure and at 35 degrees Celsius solution feed temperature. It also shows that the first stage absorber $CO_2$ emission can be as low as 100 ppm at $CO_2/NH_3$ mole ratio below 0.45 and that the $CO_2$ emission from the send stage absorber is nil.

Referring back to FIG. 1, the system is typically designed with the absorber 300 and the stripper 500 operating at similar pressures and in the range of 5-200 Bara. In FIG. 1, the stripper pressure is only 1-3 bar higher than that of the absorber and low pressure drop pump 100 is required to pump the rich solution, stream 132, from the absorber through a flash chamber 101 and recuperating heat exchanger 102 to the stripper. In the flash chamber the dissolved $H_2$, CO, $CH_4$ and other non-acidic gas species are stripped from the rich solution to form gas stream 136 that flows back to the absorber. Gas stream 136 also contains small amount of $CO_2$, $H_2S$ and $NH_3$. The solubility of $H_2$, CO and $CH_4$ in the solution at the bottom of the absorber is low and the flash chamber reduces the concentration to single digit ppm levels. As a result, the stripper gas outlet, stream 144, is practically free of $H_2$, CO and $CH_4$. The solution feed stream to the stripper 500, stream 138, is a heated solution with heat content that is recovered in the recuperating heat exchanger 102 from the lean solution stream 140.

Heat input to the stripper is typically in the range of 40-60 KJ per mole of acid gas stripped is delivered to the reboiler 104 by heating recycle stream 142. The ammoniated solution is chemically stable and does not degrade under the operating conditions of the stripper. As a result, the heat source in the reboiler is not limited to using condensing steam, but it can also use other sources of heat such as hot syngas, hot flue gas, hot oil from solar collectors, hot brines etc.

Stream 140 is a hot, typically in the range of 150-250 degrees Celsius, and $CO_2/H_2S$ lean solution from the stripper. It is cooled in the recuperating heat exchanger 102 while heating the rich solution stream 134. Further cooling of the lean solution is provided in heat exchanger 103. Typical temperature of the feed to the absorber, stream 130, when using cooling tower water for heat sink in heat exchanger 103, is 20-40 degrees Celsius.

The stripper 500 is designed in such a way that its temperate at the gas outlet is lower than 40 degrees Celsius and typically in the range of 20-40 degrees Celsius. As a result water and ammonia concentration in the outlet gas stream is low, corresponding to their vapor pressure over the inlet solution to stage 506 in FIG. 5. For example, when the temperature at the stripper gas outlet is 40 degrees Celsius and the stripper operates at 50 Bara the moisture content of the acid gas from the stripper is about 0.15% and ammonia concentration is about 1 ppm. The acid gas stream 144 from the stripper contains more than 99.7% $CO_2$ and $H_2S$, less than 0.3% water vapor and practically no $NH_3$, $H_2$, CO and $CH_4$.

The water from second stage absorber 400 and from the top of the stripper 500 contains $NH_3$, $CO_2$ and $H_2S$ captured from the pressurized gas stream 122 and from the product acid gas stream 144. The water is sent to a sour water treatment system where heat is provided through reboiler 114 to generate water containing low concentration of ammonia in the range of 0-0.2 molal. The treated water from stripper 106 is re-used and is sent back to the second stage absorber, stream 146, and to the top of the main stripper, stream 148. The gas from the sour water stripper 106 containing $CO_2$, $H_2S$, $NH_3$ and water vapor, stream 150, is sent to the bottom of the stripper 500. Depending on the relative operating pressures of the sour stripper 106 and the main stripper 500 a compressor may be used to push gas stream 150 to the main stripper.

First Stage Absorber Vessel and System

The first stage absorber and system is a multistage vessel 300 with at least two absorption stages each designed to achieve optimal results. A schematic of a three-stage absorber designed for high efficiency capture of $CO_2$ and $H_2S$ is shown in FIG. 3.

Feed gas, stream 120, containing $CO_2$ and $H_2S$ is injected to the bottom of the absorber, stage 306, and it flows upwards through the absorber stages 304 and 302 to exit as clean outlet gas at the top, stream 122. The solution fed to the top of the absorber, stream 326, is a mix of lean solution from the stripper, stream 130, and semi-rich solution from the second stage, stream 324. The resultant stream has $CO_2/NH_3$ mole ratio of 0.3-0.4 a ratio which is designed to optimize the capture of $CO_2$ and $H_2S$ while minimizing ammonia emission from the absorber. The mixed gas stream is cooled in heat exchanger 103 to below 40 degrees Celsius before it is fed to the top of the absorber.

For example, the equilibrium gas concentration above 12 molal $NH_3$ solution at 35 degrees Celsius and 50 bara and containing $CO_2/NH_3$ mole ratio of 0.33 is about 4,000 ppm $NH_3$ and less than 100 ppm each for $CO_2$ and $H_2S$. The absorber gas outlet can be designed to achieve ammonia equilibrium concentration of 4000 ppm, $CO_2$ concentration above equilibrium and less than 1,500 ppm and $H_2S$ concentration of 100 ppm. It is important to keep the acid to ammonia mole ratio in the gas at above 0.4 so that after capturing all the residual species from the gas the second stage absorber solution is highly alkaline with $CO_2/NH_3$ smaller than 0.4 so that it can capture all the residual $CO_2$ and $H_2S$.

Figure 3:
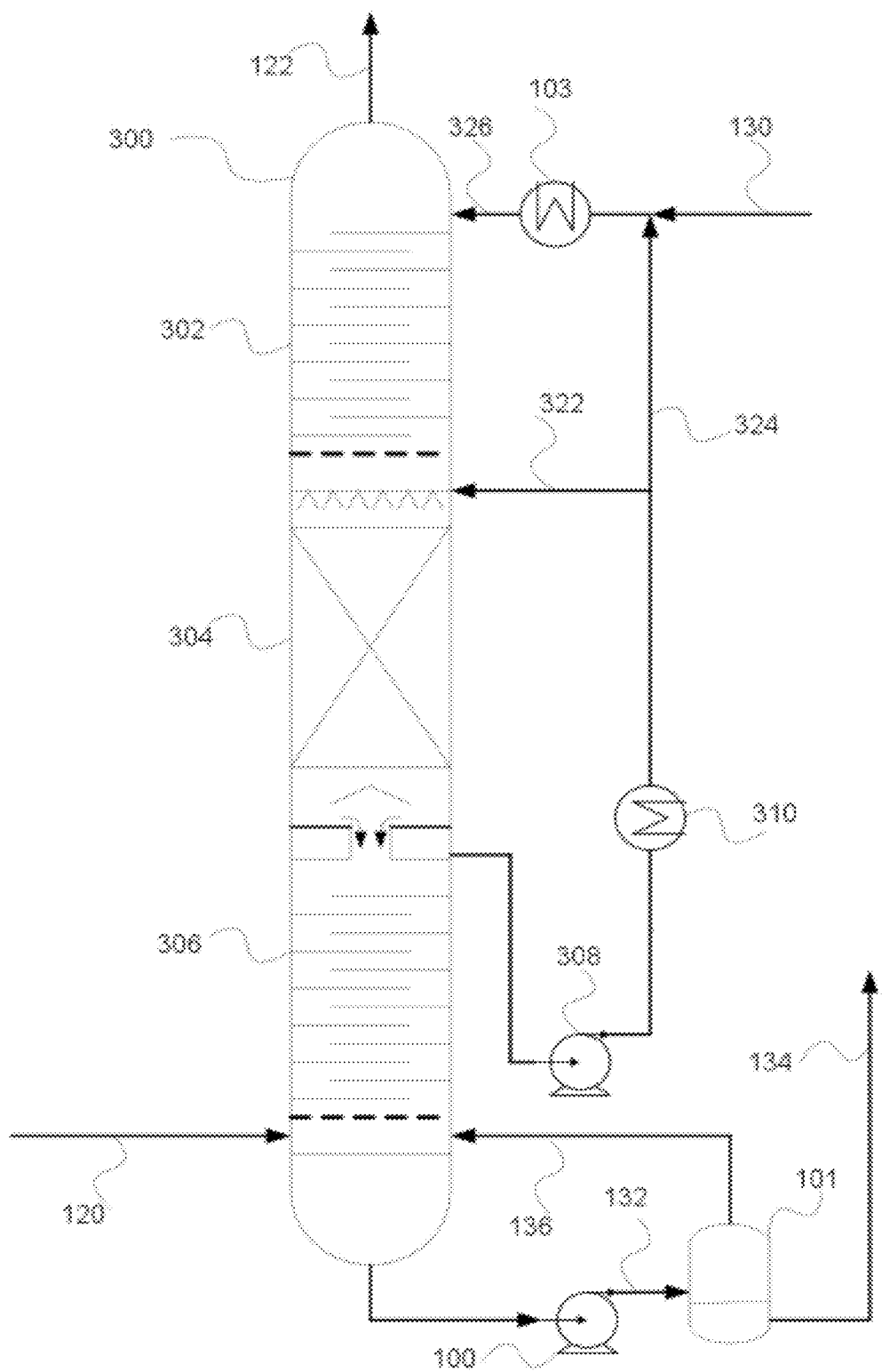
FIG. 3 shows according to an embodiment of the invention a schematic of a three-stage first multistage absorber for the capture of $CO_2$ and $H_2S$.

The top stage absorber in FIG. 3 is shown as a tray tower, but it can also be a packed tower or other gas-liquid contacting device. Also, the stage can operate as a once through liquid as shown in FIG. 3 or it can have a recycle. Due to the low $CO_2/NH_3$ mole ratio of the solution, 0.3-0.4 in the top stage 302, the absorption rate of $CO_2$ and $H_2S$ into the solution is high. At the liquid outlet from the top absorber stage the solution is 3-15 degrees Celsius warmer than the feed solution 326 due to the heat of reaction of the $CO_2$ and $H_2S$ absorption.

The solution from the top stage is fed to the middle stage 304 where it is mixed with cooled recycle solution, stream 322. FIG. 3 shows the middle absorber stage 304 as a packed tower with recycle. Other gas-liquid contacting devices can be applied as well. The recycle stream in the middle stage, stream 322, is designed to increase liquid flow in the stage, to increase the rate of mass transfer and to control the stage temperature. Heat exchanger 310 removes excess heat of reaction from the recycled solution and it prevents overheating of the solution maintaining the temperature at 40-60 degrees Celsius. The recycle of the solution is done by recycle pump 308. Excess solution from the middle stage flows to the bottom stage.

The bottom stage 306 absorber is designed to produce $CO_2$ and $H_2S$ rich solution and to maximize the $CO_2$ and $H_2S$ loading of the solution. Depending on the partial pressure of $CO_2$ and $H_2S$ in the gas feed, stream 120, and on the design characteristics of the stage, i.e. height of the stage, gas velocity, type of packing and operating temperature the outlet solution from the absorber can have as high as 0.7 $CO_2$ to $NH_3$ mole ratio and net loading, the difference in $CO_2$ and $H_2S$ content between the solution inlet to the absorber, stream 130, and the solution outlet from the absorber, stream 134, as high as 330 grams per 1000 grams of water or 7.5 molal of $CO_2$.

The high ionic strength and the high $CO_2$ loading of the solution at the bottom stage of the absorber may result in the precipitation of crystals of ammonium bicarbonate. For example, solution containing 12 molal of ammonia and having acid-to-$NH_3$ mole ratio of 0.7 should be at temperature greater than 60 degrees Celsius to prevent solids precipitation. As a result, the cooling of the middle stage absorber in heat exchanger 310 is controlled in such a way that the temperature in the bottom stage is 3-5 degrees Celsius higher than the precipitation temperature of solids.

Depending on the absorber pressure, $H_2$, CO, $CH_4$ can be physically absorbed in the solution. To eliminate practically all physically dissolved species from the solution so that loss of valuable species is eliminated and the acid gas from the main stripper contains only $CO_2$ and $H_2S$ a flash chamber 101 is installed at the solution outlet from the absorber. The outlet solution from the absorber, stream 132, is flashed into the flash vessel optionally after heating the solution by 3-10 degrees Celsius. The physically dissolved species in the solution are flashed out of the solution and is sent back, stream 136, to the bottom of the absorber.

Second Stage Absorber Vessel and System

The second stage absorber and system is designed to produce gas containing low concentration of $CO_2$, $H_2S$ and $NH_3$ all in the less than 10 ppm level. The second stage absorber, Vessel 400 has at least two absorption stages. A schematic of a two-stage second absorber is shown in FIG. 4.

The inlet gas stream to the second stage absorber is stream 122, which is the outlet stream from the first stage absorber. It contains residual $CO_2$ and $H_{2S}$ and in addition it contains $NH_3$ that evaporated from the ammoniated solution in the absorber. The first stage absorber is controlled in such a way that the CO2 plus $H_{2S}$ to $NH_3$ mole ratio in gas stream 122 is less than 0.4 and as a result, the solution in the second stage absorber is highly alkaline and capable of removing residual $CO_2$ and $H_{2S}$ from the gas.

In addition to low $CO_2$, $H_2S$ and $NH_3$ emission the second stage absorber is designed to minimize the use of water which is achieved by minimizing the NH3 emission from the first stage absorber and by producing high ammonia concentration bleed stream in the range of 1-6 molal. In the example shown in FIG. 4, the absorber has 2 stages. The bottom stage 404 is a packed tower and it utilizes recycle pump 406 to recycle solution within the absorbing stage, stream 414, and to discharge excess solution, stream 412, from the system and sending it to the sour water stripper. The recycle solution, stream 414, is cooled in heat exchanger 408 to 3-10 degrees Celsius above the cooling water temperature to produce cooled solution, stream 416. Stream 416 is fed to the top of the stage 404 and is mixed with solution from the top stage 402. The bottom stage operates at molality in the range of 1-6 and it captures most of the ammonia from the gas as well as the most of the residual $CO_2$ and $H_2S$ in the gas stream.

Figure 4:
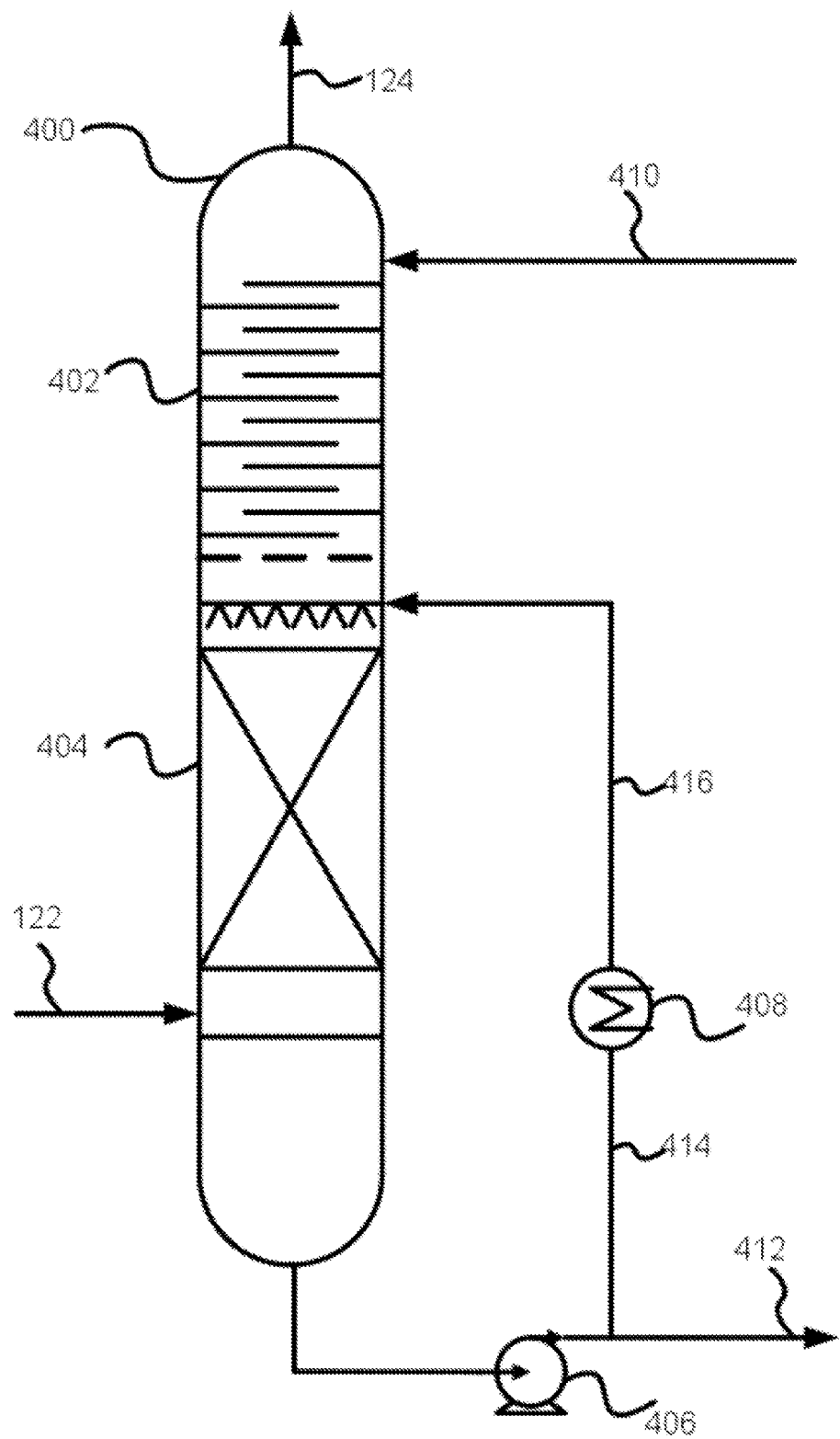
FIG. 4 shows according to an embodiment of the invention a schematic of a two-stage second multistage absorber for the capture of $CO_2$, $H_2S$ and $NH_3$.

The top stage of the second stage absorber 402 in FIG. 4 is a counter flow tray tower where water containing ammonia concentration in the range of 0-0.2 molal from the sour water stripper, stream 410, is cooled to 3-10 degrees Celsius above cooling water temperature. The cooled water is fed to the top of the absorber and flow downwards through the trays and it captures residual $NH_3$, $H_2S$ and $CO_2$ from the gas to below 10 ppm mole concentrations. Different type of packing or trays may be used in stages 402 and 404.

Main $CO_2$ and $H_{2S}$ Stripper

The main $CO_2$ and $H_{2S}$ stripper is designed to strip $CO_2$ and $H_2S$ from the rich solution produced in the absorber ($CO_2/NH_3$=0.6-0.7 mole ratio) and to convert it to lean solution ($CO_2/NH_3$=0.2-0.3 mole ratio). The stripper operates at pressure in the range of 5-200 Bara and typically at a pressure close to the pressure of the absorber. The $CO_2$ and $H_2S$ stripping is done with practically no loss of $NH_3$ from the system.

Figure 5:
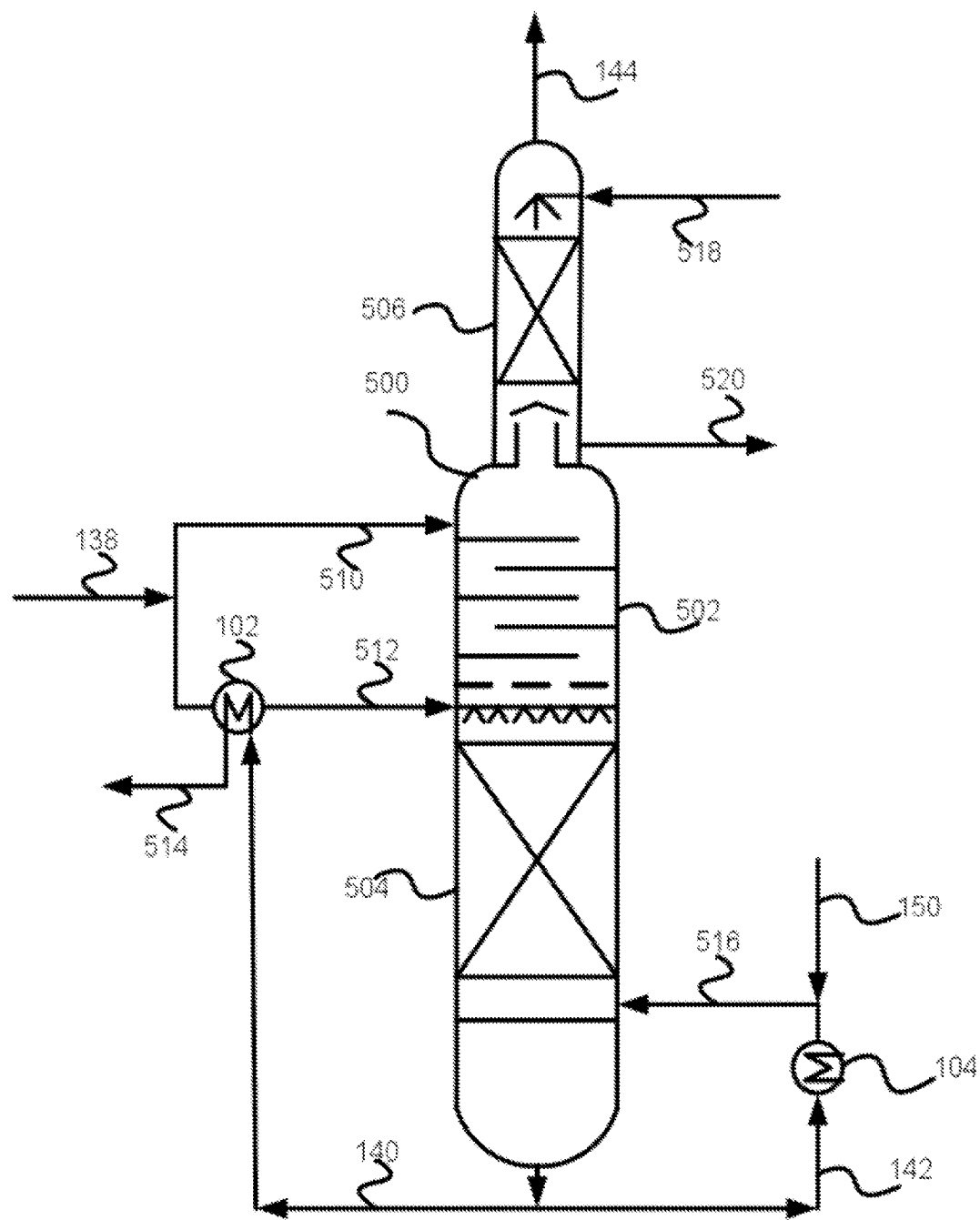
FIG. 5 shows according to an embodiment of the invention a schematic of typical $CO_2$ and $H_2S$ stripper with top stage washer for $NH_3$ capture.

A schematic of typical main $CO_2$ and $H_2S$ stripper 500 is shown in FIG. 5. Rich solution from the absorber, stream 138, is split to two. The smaller stream 510 is relatively cold and $CO_2$-rich solution and it flows to the top of the stage 502. The temperature of the stream 510 solution is typically at 60-80 degrees Celsius, to avoid the precipitation of ammonium bicarbonate. The solution flows downwards in stage 502 through a series of trays cooling the rising acid gas and capturing and condensing the ammonia and the water vapor in the gas. The heat of reaction and condensation and the sensible heat of the rising acid gas increase the solution temperature on its way down and it recovers the heat that otherwise would be lost.

The solution from stage 502 liquid outlet is mixed with stream 512, the main rich stream from the absorber, which is heated in a recuperating heat exchanger before entering the stripper.

The bottom stage of the stripper, stage 504, is typically a packed tower where hot gas from the reboiler 104, at typical temperature in the range of 150-200 degrees Celsius or higher and containing $CO_2$, $H_2S$, $NH_3$ and $H_2O$, flows upwards counter-currently to the rich feed solution. Heat and mass transfer occurs in the packed section of the stripper where the less volatile species from the gas, $H_2O$ and $NH_3$ vapor are cooled and condensed in the solution, while the more volatile species in the solution, $CO_2$ and $H_2S$, evaporate into the gas phase. As a result, the rising gas becomes richer in $CO_2$ and $H_2S$ and leaner in $NH_3$ and $H_2O$. Further enrichment of the gas in $CO_2$ and $H_2S$ occurs in stage 502 of the stripper.

Heat is provided to the stripper in the reboiler 104. The heat source to the reboiler can be any hot stream such as steam, syngas, flue gas and even heated oil from solar collectors. Stream 142 is a feed solution to the reboiler and stream 516 is a two phase stream from the reboiler. The gas phase in stream 516 contains the gas species that evaporated in the reboiler as well as gas species from the sour water stripper stream 150.

Hot lean solution, stream 140, is withdrawn from the bottom of the stripper and sent to the recuperating heat exchanger 102 to cool the solution, stream 514, and to recover its heat. In a system where the stripper pressure is higher than the absorber pressure a pump is installed to pump the rich solution to the stripper. In a system where the stripper pressure is lower than the absorber pressure the pump is installed to pump the lean solution to the absorber.

A wash stage 506 is installed at the top of the stripper and is designed to capture all the ammonia from the gas stream and to further reduce the moisture content of the gas stream. Stage 506 is a packed or tray tower where cooled water from the sour water stripper, stream 518, is fed to the top and flows downwards counter currently to the rising acid gas. The high partial pressure of the $CO_2$ in the acid gas results in high concentration of dissolved $CO_2$ in the solution and enhances the capture of $NH_3$. The outlet solution from stage 506, stream 520 contains practically all the ammonia that enters the stage in the gas phase.

The outlet gas stream 144 from the top of the main stripper is pure $CO_2$ and $H_2S$ stream except for 0.1-0.3% of water vapor that can be easily removed downstream. Stream 144 contains practically no $H_2$, CO, $CH_4$ and other physically absorbed species from the absorber.

Sour Water Stripper

The sour water stripper collects water containing $NH_3$, $CO_2$ and $H_2S$ from the second stage absorber 400 in FIG. 4 and from the top stage of the main stripper 506 in FIG. 5. The sour water stripper is a conventional thermal stripper preferably operating at high pressure in such a way that the stripped gas 150 flows to the main acid gas stripper 500 by the pressure difference between the two vessels. Otherwise, a compressor is used to send the gas to the main stripper.

What is claimed is:

1. A system for a multi-staged capture of $CO_2$ and $H_2S$ from a pressurized gas stream producing a clean pressurized gas stream containing less than 1 ppm $H_2S$ and less than 10 ppm $CO_2$ and achieving greater than 99.9% capture efficiency, wherein the pressure in said pressurized gas stream and said clean pressurized gas stream is above atmospheric pressure, comprising:
   (a) an alkaline solution containing 5-15 molal $NH_3$;
   (b) a first multistage absorber for absorbing $CO_2$ and $H_2S$ from said pressurized gas stream combined with said alkaline solution, wherein greater than 95% of said $CO_2$ and $H_2S$ content of said pressurized gas stream is captured in said alkaline solution, wherein a net loading of 110-330 grams of said $CO_2$ and $H_2S$ per 1000 grams of water is absorbed in said alkaline solution;
   (c) a second multistage polishing absorber using water for capturing the residual of $CO_2$ and $H_2S$ in said pressurized gas stream entrained from said first multistage absorber and $NH_3$ entrained from said first multistage absorber resulting in a gas outlet stream from said second multistage polishing absorber containing less than 10 ppm $CO_2$ and $NH_3$ and less than 1 ppm $H_2S$;
   (d) a main stripper for stripping said $CO_2$ and $H_2S$ absorbed by said first multistage absorber in said alkaline solution, resulting in:
      (i) a pure gas stream exhausted containing greater than 99.7% $CO_2+H_2S$, less than 0.3% water vapor and less than 10 ppm of each of $H_2$, CO, $NH_3$ and $CH_4$, and
      (ii) said alkaline solution reduced of said stripped $CO_2$ and $H_2S$ which is sent back from said main stripper to said first multistage absorber,
   (e) a sour water stripper for stripping said $CO_2$, $H_2S$ and $NH_3$ absorbed by said second multistage polishing absorber in said water, and said water stripped of said $CO_2$, $H_2S$ and $NH_3$ is sent back from said sour water stripper to said second multistage polishing absorber.

2. The system as set forth in claim 1, wherein said pressurized gas stream comprises an $H_2S$ concentration in the range of 0-7% mole and a $CO_2$ concentration in the range of 1-50% mole.

3. The system as set forth in claim 1, wherein said alkaline solution further comprises alkaline cations, wherein said alkaline cations are $Na^+$, $K^+$, $Li^+$, or a combination thereof.

4. The system as set forth in claim 1, wherein the said pressurized gas stream is at a pressure in the range of 5-200 bara, wherein said first multistage absorber and said second multistage polishing absorber operate at a pressure in the range of 5-200 bara, and wherein said main stripper operates at a pressure in the range of 5-200 bara.

5. The system as set forth in claim 1, wherein said first multistage absorber comprises at least two absorption stages, wherein each of said absorption stages is a gas-liquid contact vessel.

6. The system as set forth in claim 5, wherein one of said at least two absorption stages comprises: (i) said alkaline solution having a $NH_3/CO_2$ mole ratio in the range of 0.2-0.4, and (ii) an operating temperature in the range of 20-40 degrees Celsius.

7. The system as set forth in claim 5, wherein one of said at least two absorption stages comprises: (i) said alkaline solution having a $NH_3/CO_2$ mole ratio in the range of 0.3-0.55, and (ii) an operating temperature in the range of 35-60 degrees Celsius.

8. The system as set forth in claim 5, wherein one of said at least two absorption stages comprises: (i) said alkaline solution having a $NH_3/CO_2$ mole ratio in the range of 0.5-0.7, and (ii) an operating temperature in the range of 50-70 degrees Celsius.

9. The system as set forth in claim 1, wherein said second multistage polishing absorber comprises at least two absorption stages to reduce $CO_2$ and $H_2S$ emission to ppm level concentrations.

10. The system as set forth in claim 9, wherein one of said at least two absorption stages comprises: (i) a water-ammonia solution with an $NH_3$ concentration in the range of 0-0.2 molal, and (ii) a $CO_2/NH_3$ mole ratio in said water of less than 0.5.

11. The system as set forth in claim 9, wherein one of said at least two absorption stages comprises: (i) an $NH_3$ concentration in the range of 1-6 molal, and (ii) a $CO_2/NH_3$ mole ratio in said water of less than 0.5.

12. The system as set forth in claim 1, wherein said main stripper further comprises an integrated $NH_3$ washing stage.

\* \* \* \* \*